United States Patent [19]

Sawamura et al.

[11] Patent Number: 5,726,822
[45] Date of Patent: Mar. 10, 1998

[54] MOTOR CONTROL CIRCUIT WHICH REDUCES THE SPEED CONTROL GAIN AND DISABLES AN OSCILLATION PREVENTING FILTER WHEN THE MOTOR SPEED IS NOT WITHIN A PREDETERMINED RANGE

[75] Inventors: Yo Sawamura; Yasuyuki Ohnishi, both of Kyoto, Japan

[73] Assignee: Rohm Co., Ltd., Kyoto, Japan

[21] Appl. No.: 638,933

[22] Filed: Apr. 25, 1996

[30] Foreign Application Priority Data

Apr. 27, 1995 [JP] Japan ................. 7-103624

[51] Int. Cl.[6] ................................................. G11B 15/52
[52] U.S. Cl. ................................. 360/73.11; 360/73.08; 360/73.09; 318/608
[58] Field of Search ................ 360/73.08, 73.09, 360/73.11, 73.12, 73.13, 73.14; 242/334–334.4; 318/608, 617, 619; 388/856, 813

[56] References Cited

U.S. PATENT DOCUMENTS

| | | | |
|---|---|---|---|
| 4,037,260 | 7/1977 | Busby, Jr. et al. | 360/73.11 |
| 5,313,343 | 5/1994 | Yatomi | 360/73.14 X |
| 5,548,455 | 8/1996 | Sato | 360/73.11 |
| 5,604,648 | 2/1997 | Oh | 360/73.11 |

FOREIGN PATENT DOCUMENTS 04-172982 6/1992 Japan .

*Primary Examiner*—Andrew L. Sniezek
*Assistant Examiner*—Larry T. Cullen
*Attorney, Agent, or Firm*—Nikaido, Marmelstein, Murray & Oram LLP

[57] ABSTRACT

A motor control circuit generates a signal representing a rotation frequency of a motor. It produces a motor speed error signal based on the rotation frequency. The error signal is changed by a speed gain circuit and supplied to the motor driving circuit through a filter. The filter is for preventing an oscillation in a servo loop. When the motor speed is out of a predetermined range, a gain of the speed error signal is reduced and the filter is disabled.

7 Claims, 3 Drawing Sheets

MOTOR CONTROL CIRCUIT WHICH REDUCES THE SPEED CONTROL GAIN AND DISABLES AN OSCILLATION PREVENTING FILTER WHEN THE MOTOR SPEED IS NOT WITHIN A PREDETERMINED RANGE

BACKGROUND OF THE INVENTION

1. Field of the Invention

The present invention relates to a motor control circuit and, more particularly, to a motor control circuit for use in a videocassette recorder (hereinafter referred to as VCR).

2. Description of the Prior Art

A VCR is provided with a search mode as one of various special tape playing modes. In the search mode, a high-speed search and a low-speed search are available and, when the search speed is changed from one speed to the other, the speed of a motor greatly changes.

In general, a capstan servo system in a VCR generates a speed error signal based on an FG signal resulting from the rotation of a motor, and generates a phase error signal based on a control signal (CTL signal) reproduced by a control head. Those error signals are multiplied by a predetermined value to obtain magnified error values, and the resulting signals are used as control signals. The phase system error signal is fed through a phase system filter to an adder, where it is added to the speed system error signal. The output of the adder is then fed through a speed system filter to a motor driver and finally controls the motor. The motor directly drives a capstan, thereby causing a recording tape to be set in motion.

During switching of speeds, the phase error signal is substantially interrupted so that the motor is controlled exclusively by the speed error signal.

However, in the switching of speeds as described above, in particular when a speed is slowed down greatly as in switching from a high-speed search to a low-speed search, the switching takes much time in shifting from speed A (high-speed) to speed B (low-speed) as shown in FIG. 2, with a broken line α, and causes hunting as well. That is, while the phase control system filter is disabled during the switching of speeds, the speed control system filter remains active all the while, thereby causing the filter to bring about a transient phenomenon as shown in FIG. 2, with a broken line α.

Especially, in the case where the speed control system filter is realized with a digital filter, it takes more time for a speed to converge on speed B, because the sampling speed varies in such a way that impairs the performance (or, slows down the response) of the filter.

SUMMARY OF THE INVENTION

An object of the present invention is to provide a motor control circuit that suppresses hunting and quickly converges a speed on a desired value during switching of speeds.

A motor control circuit of the present invention is provided with means for generating a signal representing a motor rotation frequency, means for outputting a motor speed error signal based on the motor rotation frequency signal, speed gain means for changing an error value of the speed error signal, a filter through which an output from the speed gain means passes in order to prevent oscillation in a speed servo loop, detecting means for detecting a motor speed based on the rotation frequency signal and for detecting whether or not the motor speed is within a predetermined range, means for reducing a gain of the speed error signal when the motor speed is out of said predetermined range, and means for disconnecting said filter from the servo loop when the motor speed is out of said predetermined range. The servo loop is a closed loop including the motor and all of said means and filter.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
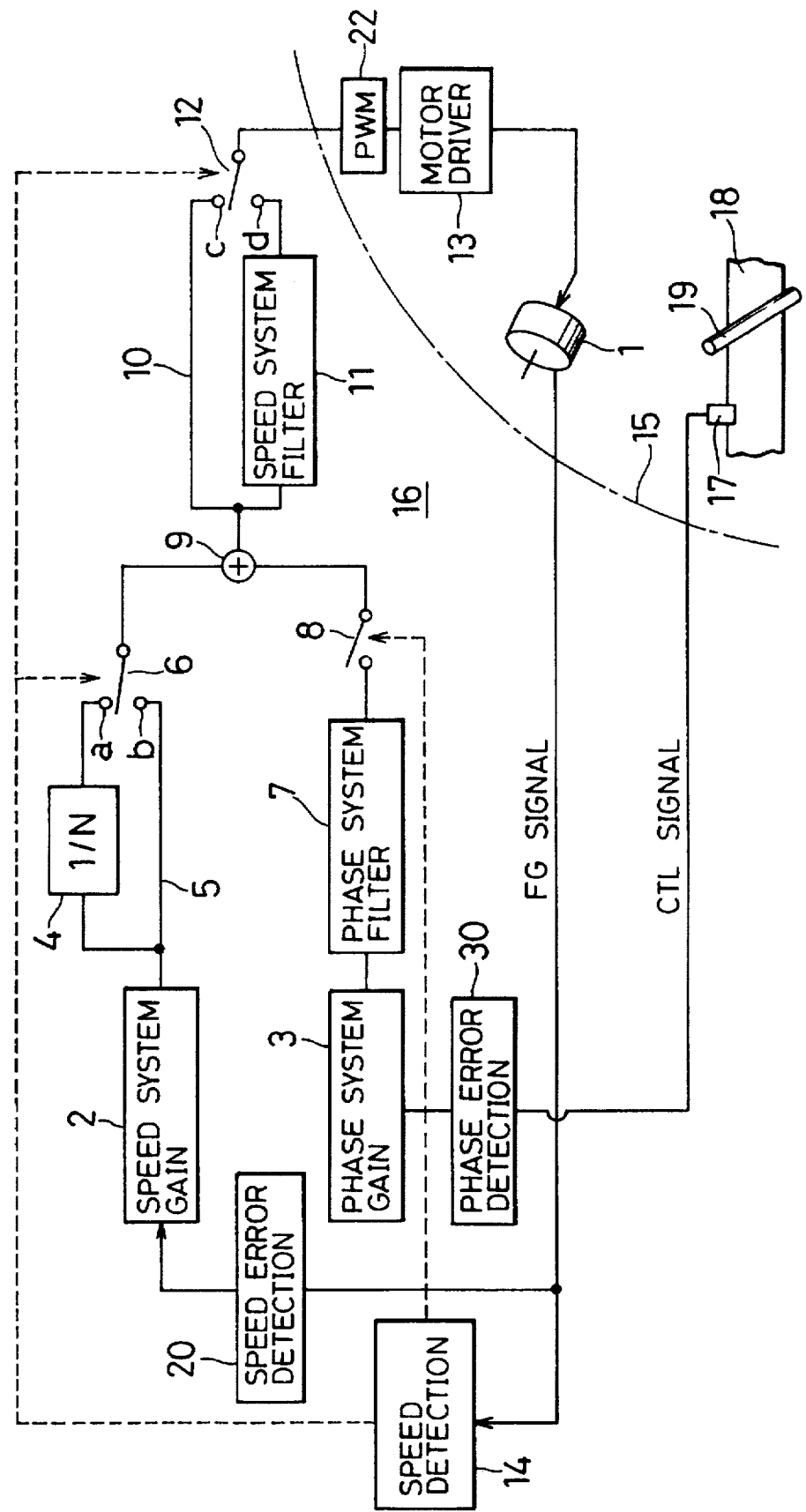
FIG. 1 is a circuit diagram of a capstan servo circuit for a VCR embodying the present invention.

In FIG. 1, reference numeral 1 represents a capstan motor that directly drives a capstan 19 in a VCR. Reference numeral 20 represents a speed error detection circuit for detecting a speed of the motor based on an FG signal resulting from rotation of the motor and for generating a difference (error signal) between the motor speed and a reference speed. Reference numeral 2 represents a speed system gain circuit that amplifies the speed error signal. Here, amplification of an error signal means magnification or reduction of the error. When an error is magnified, the motor is subjected to a high control torque, and the control takes effect accordingly quickly. Reference numeral 30 represents a phase error detection circuit for generating a phase error signal based on a CTL signal reproduced by a control head 17 from a magnetic tape 18. Reference numeral 3 represents a phase system gain circuit for amplifying the phase error signal. An output from the speed system gain circuit 2 is fed by way of a gain reduction circuit 4 that reduces the gain to 1/N to a terminal a of a switch 6, on the one hand, and by way of a signal route 5 to a terminal b of the switch 6, on the other hand.

Meanwhile, the output of the phase system gain circuit 3 is fed by way of a phase system filter 7 and a switch 8 to an adder 9, where it is added to the output of the switch 6. It is to be noted here that the output of the phase system filter 7 is not fed to the adder 9, because the switch 8 is open during switching of speeds.

The adder 9 is connected to a signal route 10 and a speed system filter 11, and the output of the signal route 10 and that of the speed system filter 11 are supplied to terminals c and d of a switch 12, respectively. The speed system filter 11 serves for suppressing (preventing) oscillation in the servo system. The output of the switch 12 is used, by way of a motor driver 13, to control the motor. The above-mentioned switches 6, 8 and 12 are realized with semiconductor switches.

A speed detector 14 not only detects the speed of the motor 1 based on the FG signal, but also detects a deviation of the motor speed from a predetermined range relative to a predetermined speed. Therefore, if a current motor speed is out of the predetermined range, it turns the switch 8 off to disable the phase servo system and turns the switches 6 and 12 to the a and c positions, respectively, thereby reducing the gain to 1/N and canceling the speed system filter 11. Normally, the switch 8 is in the ON position and the switches 6 and 12 are in the b and d positions, respectively. In FIG. 1, the portion 16 shown on the left hand of a long-and-shortdash line 15 is formed by an IC (integrated circuit). This IC is hereinafter referred to as a "servo IC". Reference numeral 22 represents a PWM circuit for converting an output value from the IC into a PWM (pulse width modulation) signal if an output from the servo IC is a digital value, that is, if the IC is a digital servo circuit.

When a servo IC comprises digital circuits, the speed gain circuit 2 multiplies the speed error signal by a coefficient stored in a register in advance. The phase gain circuit 3 multiplies the phase error signal by a coefficient. Different coefficients are stored for different modes of a VCR, such as recording mode, play mode and search mode of the SP mode, and recording mode, play mode and search mode of the EP mode, and the like.

Figure 3:
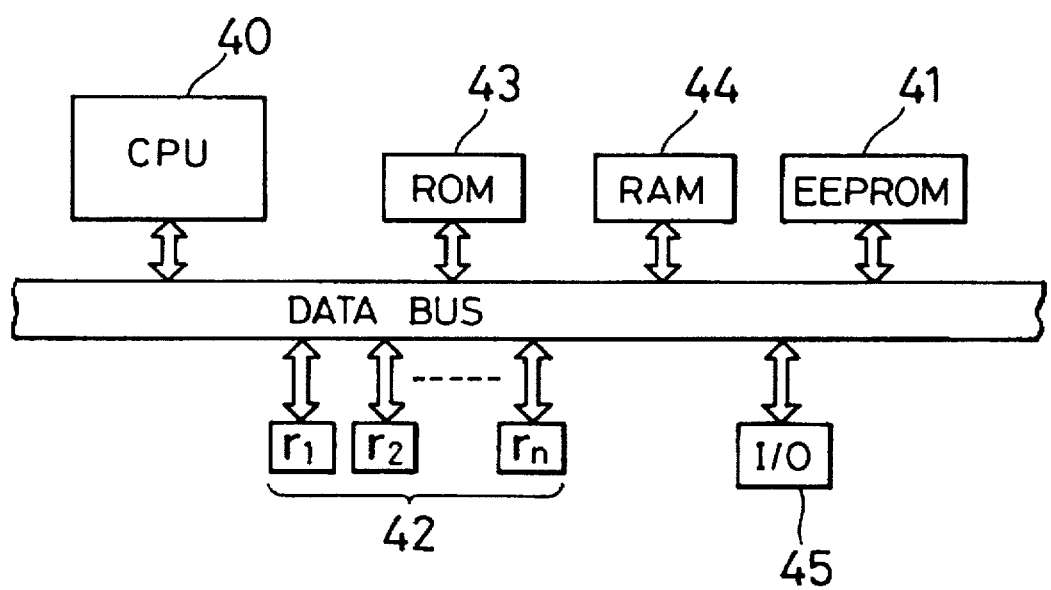
FIG. 3 is a block diagram showing the principal part of a capstan servo circuit constructed with a microcomputer.

When a servo IC comprises a microcomputer to perform a process on a software basis, a CPU 40 in FIG. 3 calculates a speed error signal based on the FG signal. Coefficients are stored in an erasable-programmable memory 41. When a mode is selected, a register 42 loads a coefficient corresponding to the mode, and said speed error signal is multiplied by the coefficient. During switching of speeds, a gain of the speed error signal multiplied by the coefficient is reduced. The phase system filter 7 and the speed system filter 11 are realized with software-based integrators. The switches 6, 8 and 12 are realized by selecting an adequate register r1, r2, . . . rn from the register portion 42. For example, the switch 6 is realized by retrieving a value either from a register storing the speed error signal or from a register storing a value obtained by reducing the speed error signal to 1/N. The adder 9 is also realized by an addition operation in the CPU, and therefore, it is not necessary to provide a separate adder 9.

Figure 2:
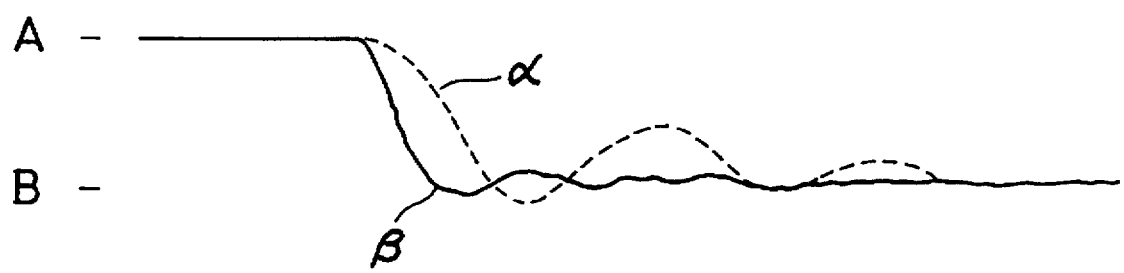
FIG. 2 is a operational diagram illustrating the operation of the capstan servo circuit during switching of speeds.

When the speed is switched from speed A of a high-speed search to speed B of a low-speed search, the speed system filter 11 is canceled so that the motor quickly reaches speed B, as shown in FIG. 2 with a solid line β, with substantially no hunting being caused. As a result, the speed quickly converges on speed B. In addition, since the speed servo system operates under a condition where the gain is reduced to 1/N, there is substantially no possibility of oscillation occurring in the servo system. Similarly, when the speed is switched from speed B of a low-speed search to speed A of a high-speed search, the speed quickly converges on speed A.

As described above, the present invention realizes a quick switching of speeds without oscillation in a servo loop. At the same time, it suppresses hunting as well.

Figure 4:
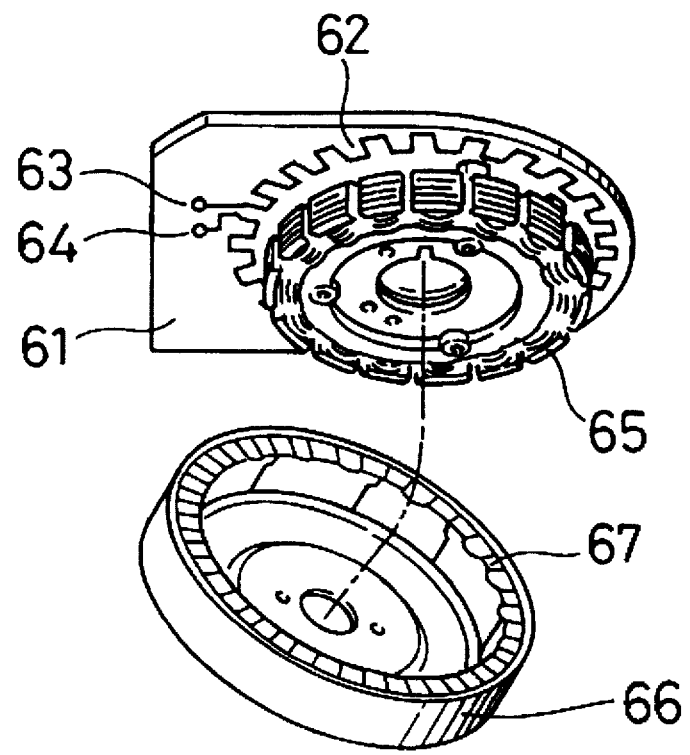
FIG. 4 is a drawing showing a structure for generating an FG signal.

FIG. 4 shows a construction for generating an FG signal. Reference numeral 61 represents a stator substrate. On the stator substrate 61, a stator 65 is mounted and an FG pattern 62 is formed. Reference numerals 63 and 64 represent output terminals of the FG signal. Reference numeral 66 represents a rotor. Reference numeral 67 represents magnets facing the FG pattern 62. The stator 65 and the rotor 66 composes the motor 1 in FIG. 1.

What is claimed is:

1. A motor control circuit, comprising:
   means for generating a signal representing a rotation frequency of a motor;
   means for outputting a motor speed error signal based on the motor rotation frequency signal;
   speed gain means for changing an error value of the speed error signal;
   a filter through which an output from the speed gain means passes to prevent oscillation in a speed servo loop;
   detecting means for detecting a motor speed based on the rotation frequency signal and for detecting whether or not the motor speed is within a predetermined range;
   means for reducing a gain of the speed error signal when the motor speed is out of said predetermined range; and
   means for disabling said filter when the motor speed is out of said predetermined range.

2. A motor control circuit as claimed in claim 1, wherein the speed gain means comprises a storage means for storing a coefficient by which the speed error signal is to be multiplied, and means for retrieving the coefficient and for multiplying the speed error signal thereby.

3. A motor control circuit as claimed in claim 1, further comprising:
   means for generating a signal representing a rotation phase of a motor; and
   a phase servo system for controlling the rotation phase of the motor.

4. A motor control circuit as claimed in claim 3, further comprising:
   means which uses a sum of an output from the phase servo system and the speed error signal as a motor control signal when a motor speed is within said predetermined range, and which suppresses an output of the phase servo system thereby using only the speed error signal as a motor control signal when a motor speed is out of said predetermined range.

5. A motor control circuit for driving a capstan of a VCR, comprising:
   means for generating an FG signal representing a rotation frequency of a motor;
   means for reproducing a CTL signal recorded on a magnetic tape transferred by a capstan;
   means for forming a motor speed error signal based on the FG signal;
   speed gain means for changing an error value of the speed error signal;
   means for forming a motor phase error signal based on the CTL signal;
   phase gain means for changing an error value of the phase error signal;
   adding means for adding an output from the speed gain means to an output from the phase gain means;
   a filter for preventing oscillation through which an added error signal passes;
   detecting means for detecting a motor speed based on the FG signal and for detecting whether or not the motor speed is within a predetermined range;
   means for reducing a gain of the speed error signal when the motor speed is out of said predetermined range;
   means for reducing the output from the phase gain means when the motor speed is out of said predetermined range; and
   means for disabling said filter when the motor speed is out of said predetermined range.

6. A motor control circuit as claimed in claim 5, wherein the speed gain means comprises a storage means for storing a coefficient by which the speed error signal is to be multiplied, and a means for retrieving the coefficient from the storage means and for multiplying the speed error signal thereby.

7. A motor control circuit as claimed in claim 6, wherein the storage means stores coefficients corresponding to different operation modes of a VCR.

* * * * *